Patented July 30, 1929.

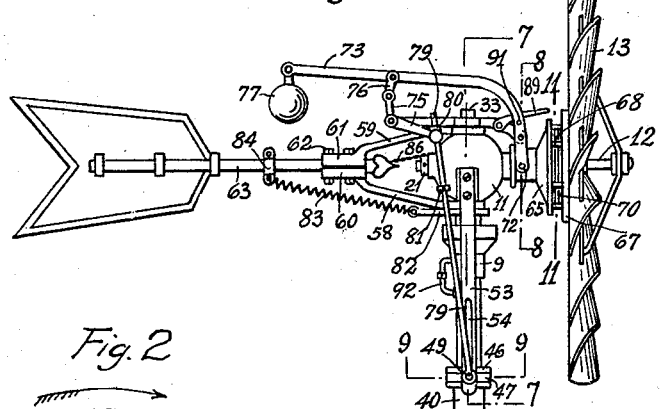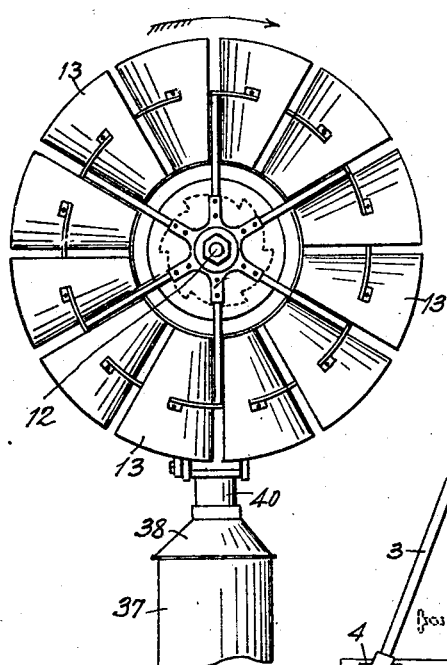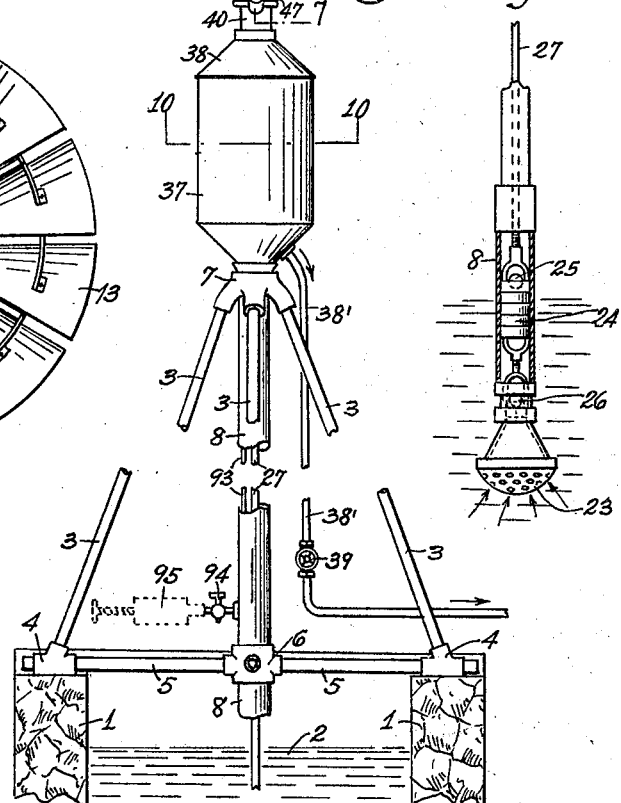

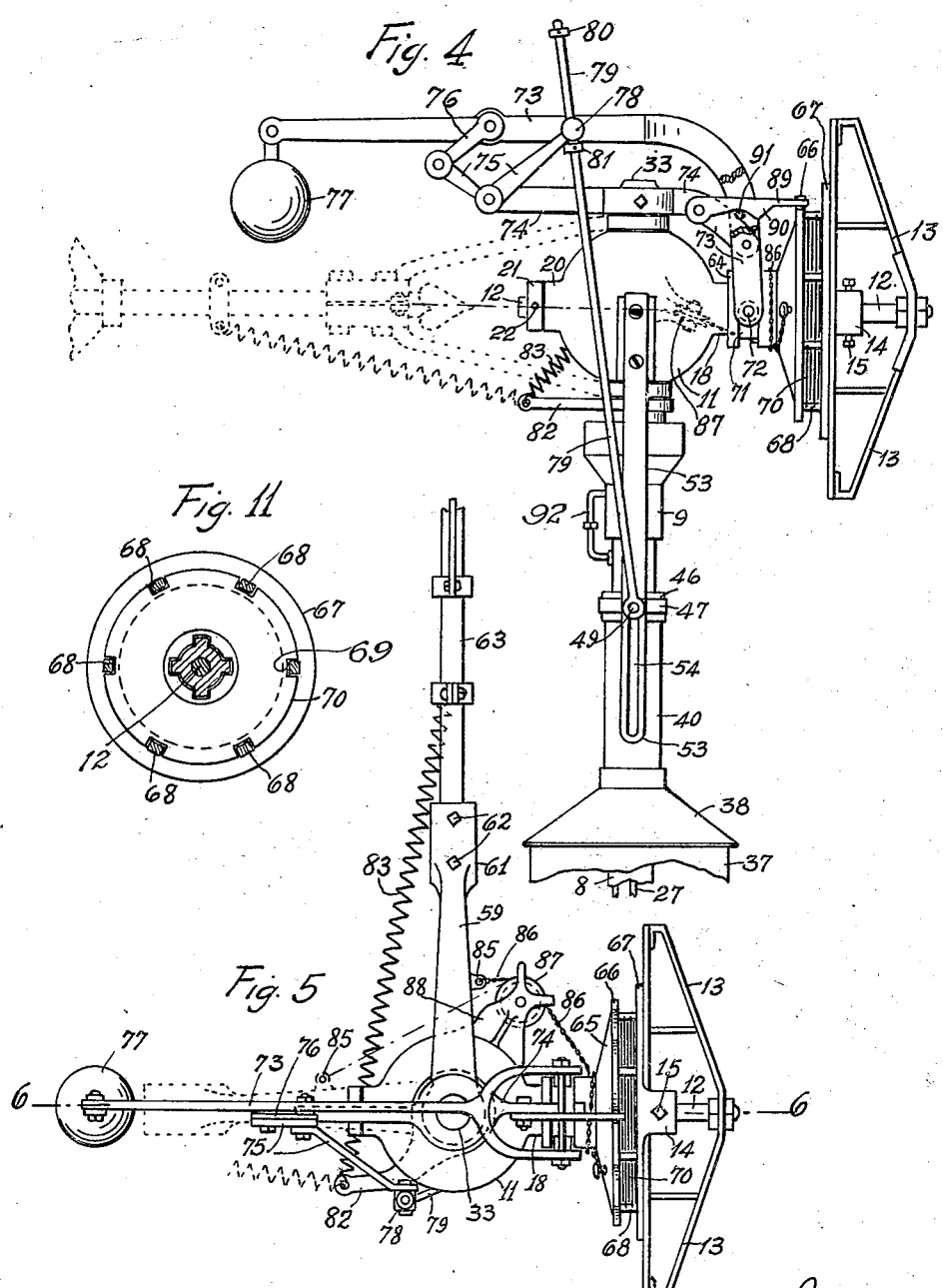

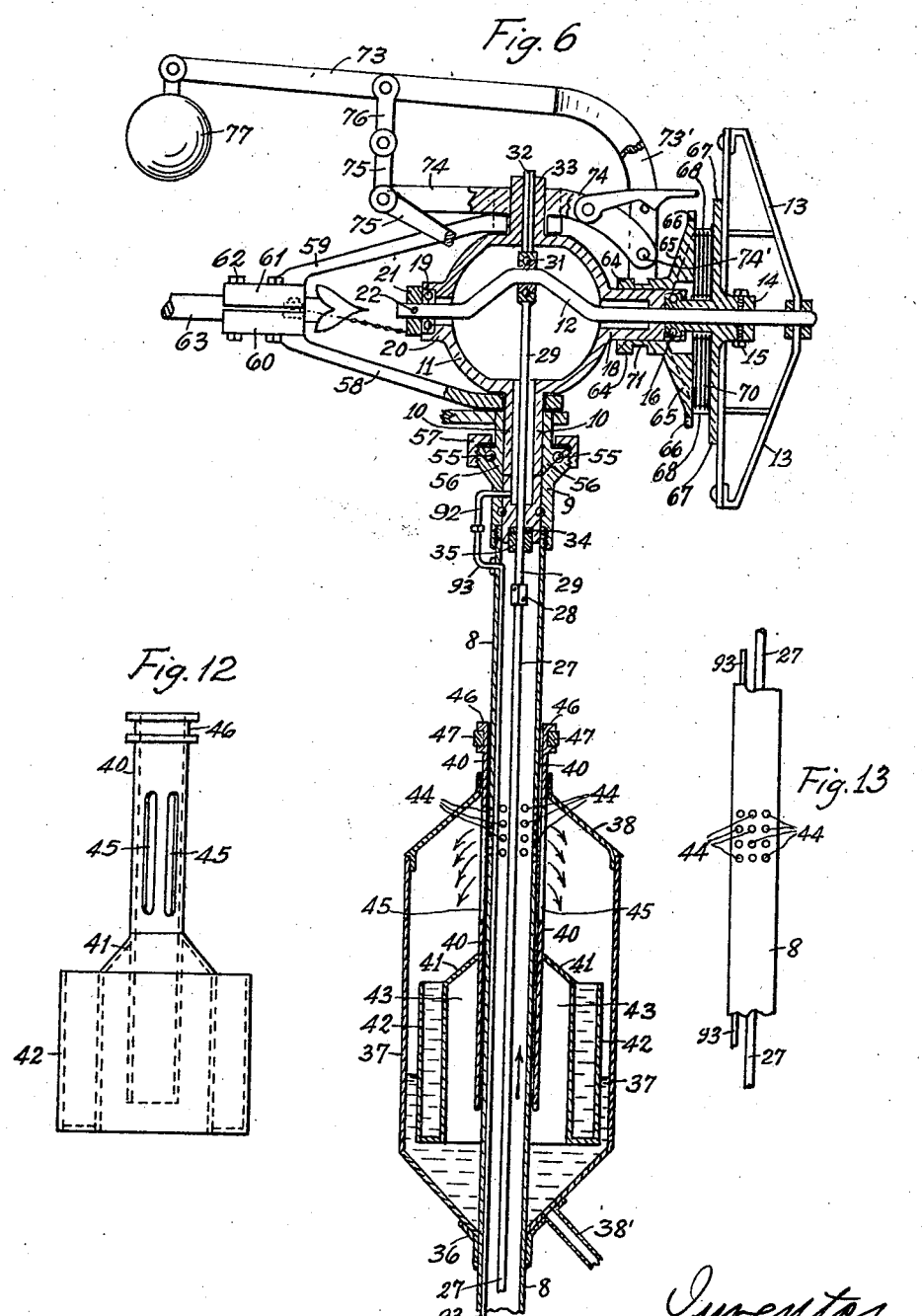

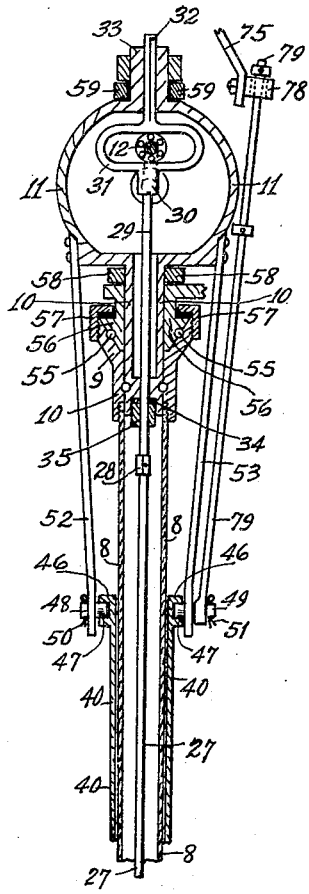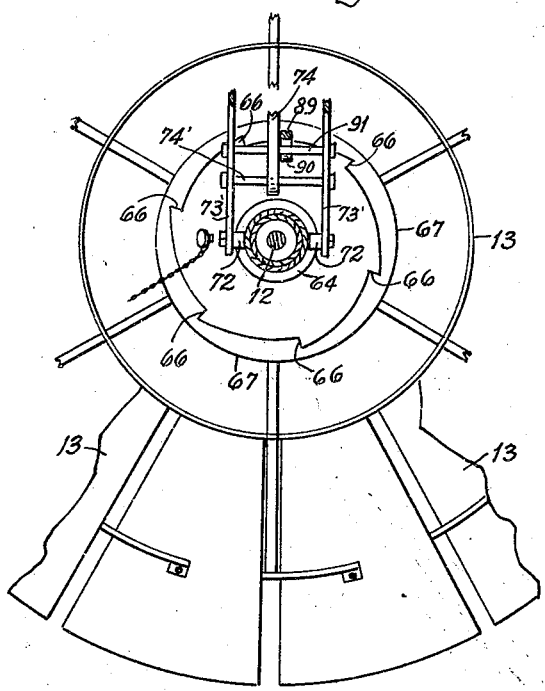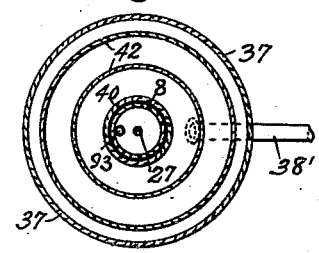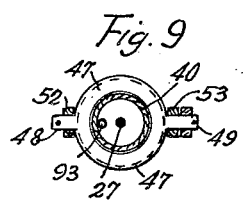

1,722,845

UNITED STATES PATENT OFFICE.

PEDRO M. GONZÁLEZ AND JUAN A. SILVA, OF HABANA, CUBA; SAID GONZÁLEZ ASSIGNOR OF ONE-HALF OF HIS RIGHT TO ELOY A. NOVOA, OF MARIANAO, CUBA.

WINDMILL.

Application filed December 5, 1927, Serial No. 237,907, and in Cuba April 23, 1927.

This invention relates to windmills and its object is to provide a new windmill structure having suitable means whereby an automatic operation is obtained, that is, when there is a demand for the liquid, the windmill will operate normally, but when the demand for liquid ceases, the windmill will automatically stop and the wind wheel prevented from acting upon the piston elevating the liquid.

The invention contemplates, furthermore, to provide a windmill having automatic means whereby the motion of the wind wheel is checked and the windmill stops in its operation due to the cessation of a demand for the liquid, the rudder will assume a new position at an angle of 90° to the normal operating position, thus indicating to the observer or operator the operative or inoperative condition thereof.

And another object of the invention is to provide means whereby lubricating material may be easily fed from the ground to the mechanism located at the top of the windmill tower.

The invention is described with reference to the figures of the enclosed drawing, in which:—

Fig. 1 is an outside front elevation of a windmill constructed in accordance with this invention.

Fig. 2 is a partial end view showing the wind wheel and the liquid containing tank provided with an automatic operating float.

Fig. 3 is a detailed view showing in partial section an elevation of the submerged end of the pipe elevating liquid from the well.

Fig. 4 is a detailed view drawn at a larger scale, of a front elevation of the upper part of the liquid containing tank provided with an automatic operating float and the whole mechanism located above same.

Fig. 5 is a detailed upper plan view of the same parts represented in Fig. 4, but showing a modified position of the rudder.

Fig. 6 is a vertical diametral section of the windmill on the line 6—6 of Fig. 5.

Fig. 7 is a detailed vertical section on the line 7—7 of Fig. 1.

Fig. 8 is a detailed vertical section on the line 8—8 of Fig. 1.

Fig. 9 is a detailed horizontal section on the line 9—9 of Fig. 1.

Fig. 10 is a detailed horizontal section on the line 10—10 of Fig. 1.

Fig. 11 is a detailed vertical section on the line 11—11 of Fig. 1.

Fig. 12 is a detail showing in elevation the float mounted within the liquid containing tank and which operates automatically.

And Fig. 13 is a detail showing in partial elevation the pipe for elevating the liquid in its portion within the tank containing the float.

In the drawings, 1 is the curbstone of a well from which a liquid 2 is to be elevated by means of a windmill, the latter being formed by means of a tubular tripod 3, fixed upon the curbstone 1 by means of T joints 4 that connect with two cross bars 5 bearing on their center a ring 6, across which and across the opening 7 formed at the top of the tripod, is secured the liquid raising pipe 8, which extends upwards up to a suitable height and on its extreme upper end is screwed a rotary supporting casing 9, cylindrical in its lower portion and tapered on the upper portion, there being a fixed seat within the lower cylindrical portion of said casing 9 for the bottom closed post 10 which is integral with a spherical box 11, formed by two segmental portions fitted one to another and within which box is rotatably mounted the crankshaft 12 of the wind wheel 13, the bushing 14 of the latter being held there by set bolts 15 upon the shaft 12 and connected by means of a ball bearing box 16 with the bearing 17 formed at one end of a tubular horizontal extension 18 of the spherical box 11, the crankshaft 12 being supported at the opposite end of a ball bearing race 19 mounted at the end of the horizontal tubular extension 20 of the spherical box 11, the crankshaft 12 being retained there by a collar 21, fixed by means of a pin 22.

The liquid elevating pipe 8 is provided at its lower end with a perforated head 23 and inside the pipe, on the lower portion of same, is mounted the perforated piston 24, provided with the check valves 25 and 26, designed to give way to the liquid upwards but not downwards, the piston 24 being joined to a connecting rod 27, extended upwards inside of pipe 8 until it reaches close to the tubular post 10 of the spherical box 11, where said connecting rod 27 connects with another connecting rod 29 by means of a knuckle joint 28, said connecting rod 29 passing through the inside of the tubular post 10 and ending inside the spherical box 11, under the curved portion of the crankshaft 12, where it connects through a knuckle joint 30 with an oval piece provided with a horizontal slot 31 that rides upon said curved portion of the crankshaft 12 and has an upper stem 32 passing through a vertical extension 33 formed at the top of the spherical box 11. In the place where the connecting rod 29 passes through the closed end of the tubular post 10, within a recess formed in same, is arranged a rubber packing ring 34, pressed by a threaded stopper 35.

Directly upon the head of the tripod 3 and joined to pipe 8 by means of a connecting piece 36 of an angular cross section shape, there is a cylindrical tank having a conical bottom 37 and which is provided with a tapering cover 38, the cylindrical head of which adjusts around a tubular bushing 40, slidable upon the pipe 8 and which is joined by a conical extension 41, through a double walled cylindrical float 42 that forms on its inside an air space 43, opened downwards, there being connected to an opening formed in the conical bottom 37, a tube 38', provided with a control valve 39, which leads the raised water to a deposit conveniently located which is not shown. The pipe 8 shows at the height of the conical cover 38 of tank 37, several vertical series of holes 44, registering laterally with windows 45 formed in the sliding bushing 40, joined to the float and in the upper end of such bushing 40 is formed an annular web 46 within which adjusts a ring 47 provided with two diametrally opposite stems 48 and 49, upon which ride through openings therein and retained thereinto by cotter pins 50 and 51, two flat strips 52 and 53 which at their upper ends are fixed by means of rivets to the lower portion of the spherical box 11, the flat strips 52 and 53 having on their lower half a vertical slot 54 wherein the horizontal stems 48 and 49 slide in their reciprocating vertical motion together with the bushing 40 and the float 42. Within the upper conical portion of the rotary supporting box 9 is pivotally mounted by means of ball bearings 55 the conical base bushing 56, the joint between the casing 9 and the bushing 56 being closed by means of a threaded annular cap 57 joined to the upper edge of the casing 9. Between the bushing 56 and the spherical box 11 is pivotally mounted around the tubular post 10 a bracket bent upwards 58 and upon the vertical extension 33 of the spherical box 11 is pivotally mounted another bracket bent downwards 59, these converging brackets 58 and 59 forming an integral part of the two horizontal plates 60 and 61, joined together by means of bolts 62 and through which is held the stem of the rudder 63, which serves to direct the wind wheel 13 to face the wind blowing at the time.

Upon the tubular extension 18 of the spherical box 11 is slidably mounted the sleeve 64 of a friction clutch, the plate 65 of which forms on its edge a series of racket teeth 66 and cooperates with the plate 67, fully attached to the wind wheel 13, said plate 67 having a circumferential series of teeth 68 which are received in peripherial notches 69 of a series of thin steel disks 70, arranged between both plates 65 and 67, and which, when pressed between both plates, form the friction of the clutch. The sleeve 64 has an annular groove 71, within which engages the horizontal trunnions 72, formed in the two downwardly bent branches 73' of a third degree lever 73 mounted on an horizontal pivot 74', supported in the downwardly curved end of a bracket 74, mounted upon the upper vertical extension 33 of the spherical box 11, which bracket extends itself at the opposite end, wherein it is pivotally mounted on a bell crank lever 75, which through its upwardly directed arm, is pivotally connected to a link 76, which, on its turn is pivotally connected to the middle point of the lever 73, said lever 73 having on its free end a weight 77, and the downwardly inclined arm of the bell crank lever 75 is connected by means of a ring 78 with a connecting rod 79, slidable with respect to said ring 78 and provided with two spaced stops 80 and 81, said rod being mounted by an eye on its lower end upon the stem 49 of the ring 47. Around the conical base bushing 56 is fixed, by means of an annular extension, a bracket 82, projecting laterally from the rudder 63 and at the end of which is secured a coil spring 83 the other end of which is fixed to a collar 84, located approximately at the middle point of the stem of said rudder and from a lug 85 formed in the plates 60 and 61 leaves a chain 86 that passing around the throat of a pulley 87, pivotally mounted in an horizontally position upon a bracket 88, joined to the spherical box 11 and which chain, after coiling around the slidable bushing 64 of the friction clutch is secured to a fixed point of the plate 65. Furthermore, in the bracket 74 is pivotally mounted a pawl 89, designed to engage one of the racket teeth 66 of the plate 67, said pawl 69 having on its inner face a tooth of inclined sides 90, designed to connect with a horizontal rod 91 that joins the branches 73' of the lever 73.

The lubricating grease is fed to the inside of the tubular post 10 of the spherical box 11, and from there to the interior of same by means of an elbow tube 92 that enters in the hole of said tubular post 10 through the supporting casing 9, said elbow tube being externally connected to the liquid elevating pipe 8 by another suitable pipe 93 that is introduced within the elevation pipe 8 and prolongs itself all the way down to a point close to the supporting base, where it emerges outwardly and ends in a control valve 94, to which may be separably attached a hand pump 95 when it might be convenient to use same.

The operation of this windmill is as follows:—When the windwheel 13 yields to the action of the wind, said wheel turns, the clutch being disengaged at the time, and carries with it the crankshaft 12, which, due to its connection with the oval piece 31, produces a reciprocating motion of the connecting rods 29 and 27 and of course, of the piston 24, located within the pipe 8, producing the aspiration and elevation through said pipe 8 of the liquid existing in the well 1, which liquid, upon reaching the height of the holes 44 of same pipe 8, passes through these holes and through the windows of the bushing 40, which register with same, and said liquid falls upon the float 42, the container of which gradually fills and once filled up the liquid overflows and falls on the conical bottom of the tank 37, going out through the tube 38 to a suitable deposit or to the service mains. Whilst this happens, the friction clutch frees the plate 65 of the windwheel 13, because in the lower position of the float 42 within the tank 37, the bell crank lever 75, the lever 73 with the weight 77 and the pawl 89 are in the position shown in Figure 6 of the drawings. But as soon as the control valve 39 is closed, due to no more liquid being needed, then the liquid within the tank 37 will have no outlet through the pipe 38' and the level of the liquid will go on raising within tank 37, with which the float 42 will also ascend, carrying along the slidable bushing 40, but since the connecting rod 79 pivotally connected to the bell crank lever 75 is joined to the stem 49 of the ring 47, upon this ring going up with the slidable bushing 40, when the stop 81 meets the end of the downwardly inclined arm of the lever 75, it will force same upwards around the pivoting point of the latter and the straight linear relation of the link 76 with the other arm of the bell crank lever 75 will be broken, assuming the position illustrated in Figure 4 of the drawings, due to the action of gravity produced by the weight 77, whereupon the lever 73 rotates upon its pivoting spindle mounted upon the bracket 74 and the rotation of the lever 73 will advance the sleeve 64 of the friction clutch drawing the plate 65 closer to the plate 67 and pressing between them the friction disks 70 stopping the motion of the wind wheel 13 and the crankshaft 12 upon which the reciprocating alternative motion of the liquid aspirating piston 24 will stop. At the same time, due to the advancement of the forked end of the lever 73 (Fig. 4) the pawl 89 comes to rest against the periphery of plate 65, connecting with one of the ratchet teeth 66 in order to hold the clutch plate. Then, at the same time, upon the advancement of the sleeve 64 of the clutch, the same pulls the chain 86, coiling it around said sleeve and since the chain 86 is joined to the rudder stem 63, the latter is rotated upon the vertical shaft formed in the vertical diameter of the spherical box 11, against the yielding action of the coil spring 83, the rudder 63 assuming the position shown at an angle of 90° in Figure 5 of the drawings. When the control valve 39 is opened again to let the liquid out for the waste mains, then the liquid accumulated in the tank 37 will descend and be level with same, the float 42 will also come down and due to the weight of the liquid it contains, come as low as the bottom of the tank 37 carrying with it the slidable bushing 40 joined by the connecting rod 79 to the bell crank lever 75 and when the upper stop 80 of said rod reaches the end of this lever, will force the arm of same downwards until assuming the position shown in Figure 6 of the drawings, in which the other arm of said bell crank lever 75 and the link 76 are in straight linear relation and the lever 73 will be raised together with its weight 77, receding the sleeve 74 and raising the pawl 89 from its holding position against the ratchet teeth 66 with which the plate 65 will be thrown back and freed of the friction, said plate 65 belonging to the wind wheel 13, and said windwheel 13 will be again free to rotate with the crankshaft 12 due to the action of the wind. At the same time, upon the clutch sleeve 64 getting back, the chain 89 will uncoil from same and release, and due to the tension of the coil spring 83, the stem of the rudder 63 will turn back to its normal position shown in Figure 1 of the drawings.

This windmill can be adapted for use either in elevating water from a well, artesian wells, oil wells, etc., as well as for any other plant where a motive power is needed that must not necessarily be of a continuous character.

It is to be understood that the constructional details of the windmill may be varied without altering the essential character of the invention, which is as hereinafter claimed for.

What we claim is:—

1. A windmill having a supporting frame, a liquid elevating pipe fixed to said frame, a piston within said liquid elevating pipe, a rotary supporting box fixed on the upper end of said liquid elevating pipe, an horizontal shaft rotatably supported above said rotary supporting box, a wind wheel fixed to said shaft, a rotary connecting means between said shaft and said piston, a tank mounted around said elevating pipe, and through which the elevated liquid is to be discharged, and means directed by a float within said tank to stop the action of the wind wheel when the liquid is no longer needed and to free the windwheel in operating position when the liquid becomes necessary again.

2. A windmill having a supporting frame, an elevating pipe fixed to said frame, a piston within said liquid elevating pipe, a rotary supporting box fixed to the upper end of said liquid elevating pipe, a horizontal shaft rotatably supported above said rotary supporting box, a windwheel fixed upon said shaft, a friction clutch slidably mounted upon the bushing of said shaft, rotary connecting means between said shaft and said piston, a tank mounted around said elevating tube and through which the elevated liquid is discharged, and means controlled by a float within said tank to automatically apply said friction clutch to the wind wheel when the liquid no longer becomes necessary and to disengage, automatically, said friction clutch when the liquid becomes necessary again.

3. A wind mill having a supporting frame, a liquid elevating pipe fixed upon said frame, a piston within said liquid elevating pipe, a rotary supporting box fixed to the upper end of said liquid elevating pipe, a bearing member supported on said supporting box, a horizontal crankshaft mounted in said bearing member, a wind wheel on said crankshaft, a clutch member movably mounted upon the bushing of the crankshaft, another clutch member fixed to the wind wheel, rotary connecting means between said crankshaft and said piston, a tank mounted on said elevating pipe and through which the elevated liquid is discharged, a float in said tank having a liquid receptacle and also having a bushing slidable on said pipe, the said pipe and the said bushing being provided with openings that coincide for the passage of liquid into the tank, a lever pivotally mounted on the bearing member, said lever being connected to the said movable member of the clutch and having a counterweight, a bell crank lever also mounted on said bearing member, a link connecting an arm of said bell crank lever and the first named lever and a connecting rod connecting the other arm of said angular lever with said slidable bushing, and having stops to engage the arm of said bell crank lever to cause the first named lever to swing and thereby actuate the movable clutch member to control the operation of the said wheel.

4. A windmill having a supporting frame, a liquid elevating pipe fixed to said frame, a piston within said liquid elevating pipe, a rotary supporting box fixed to the upper end of said liquid elevating pipe, a bearing member supported on said supporting box, a horizontal shaft rotatably supported in said bearing member and a wind wheel fixed to said crankshaft.

In witness whereof we affix our signatures.

PEDRO M. GONZÁLEZ.
JUAN A. SILVA.